United States Patent
Ishida et al.

(10) Patent No.: US 10,457,583 B2
(45) Date of Patent: Oct. 29, 2019

(54) METHOD FOR RELIEVING CORROSIVE ENVIRONMENT OF BOILING WATER REACTOR, NUCLEAR POWER PLANT, AND METHOD FOR INJECTING NOBLE METAL WHICH IS CARRIED OUT IN NUCLEAR POWER PLANT

(71) Applicant: Hitachi-GE Nuclear Energy, Ltd, Hitachi-shi, Ibaraki (JP)

(72) Inventors: Kazushige Ishida, Tokyo (JP); Youichi Wada, Tokyo (JP); Masahiko Tachibana, Tokyo (JP); Nobuyuki Oota, Hitachi (JP); Ryosuke Shimizu, Hitachi (JP); Mayu Sasaki, Hitachi (JP)

(73) Assignee: Hitachi-GE Nuclear Energy, Ltd., Hitachi-shi (JP)

( * ) Notice: Subject to any disclaimer, the term of this patent is extended or adjusted under 35 U.S.C. 154(b) by 576 days.

(21) Appl. No.: 15/418,853

(22) Filed: Jan. 30, 2017

(65) Prior Publication Data
US 2017/0287573 A1 Oct. 5, 2017

(30) Foreign Application Priority Data

Mar. 31, 2016 (JP) .................................. 2016-070291
Mar. 31, 2016 (JP) .................................. 2016-070292

(51) Int. Cl.
*G21C 17/022* (2006.01)
*C02F 5/00* (2006.01)
(Continued)

(52) U.S. Cl.
CPC .................. *C02F 5/00* (2013.01); *C02F 1/68* (2013.01); *G21C 17/0225* (2013.01);
(Continued)

(58) Field of Classification Search
CPC ...... C02F 5/00; C02F 1/68; C02F 1/722; C02F 1/727; C02F 2103/023; C02F 2303/08;
(Continued)

(56) References Cited

U.S. PATENT DOCUMENTS 5,448,605 A   9/1995  Hettiarachchi
6,724,854 B1  4/2004  Kim et al.
(Continued)

FOREIGN PATENT DOCUMENTS

JP   7-311296 A   11/1995
JP   10-339793 A  12/1998
(Continued)

OTHER PUBLICATIONS

Japanese-language Office Action issued in counterpart Japanese Application No. 2016-070291 dated Dec. 4, 2018 with English translation (five (5) pages).
(Continued)

*Primary Examiner* — Lily C Garner
(74) *Attorney, Agent, or Firm* — Crowell & Moring LLP

(57) ABSTRACT

The present disclosure provides a method for relieving a corrosive environment of a boiling water reactor, the method including a step of injecting hydrogen and a noble metal compound into water to be replenished into the reactor pressure vessel during a period of a generating operation of a boiling water nuclear power plant including the reactor pressure vessel. In the method, the hydrogen is injected into water to be supplied into the reactor pressure vessel, and the noble metal compound is injected into water in a line of the boiling water nuclear power plant in which a concentration of oxygen or hydrogen peroxide is stoichiometrically higher than the concentration of hydrogen at which hydrogen undergoes a chemical reaction to turn to water. Thus, when a noble metal is injected into a boiling water reactor, the
(Continued)

noble metal can be restrained from adhering onto a pipe for an injection and other pipes, and thereby can increase the amount of the noble metal to be injected into a cooling water in a reactor pressure vessel.

3 Claims, 6 Drawing Sheets

(51) Int. Cl.
  *C02F 1/68* (2006.01)
  *C02F 103/02* (2006.01)

(52) U.S. Cl.
  CPC .... *C02F 2103/023* (2013.01); *C02F 2303/08* (2013.01); *Y02E 30/40* (2013.01)

(58) Field of Classification Search
  CPC . C02F 2303/18; G21C 1/084; G21C 17/0225; G21D 1/006
  See application file for complete search history.

(56) References Cited

U.S. PATENT DOCUMENTS

| | | | |
|---|---|---|---|
| 9,299,463 B2 * | 3/2016 | Ito | G21C 19/32 |
| 2003/0079566 A1 | 5/2003 | Biberbach | |
| 2006/0211569 A1 | 9/2006 | Dang et al. | |
| 2014/0140465 A1 * | 5/2014 | Ishida | G21C 17/0225 |
| | | | 376/306 |
| 2014/0175186 A1 | 6/2014 | Caine et al. | |
| 2017/0236604 A1 * | 8/2017 | Ishida | G21C 17/0225 |
| | | | 376/306 |

FOREIGN PATENT DOCUMENTS

| | | | |
|---|---|---|---|
| JP | 10339793 A * | 12/1998 | |
| JP | 2003-129102 A | 5/2003 | |
| JP | 2005-10160 A | 1/2005 | |
| JP | 5451083 B2 * | 3/2014 | |
| JP | 2014-101240 A | 6/2014 | |
| JP | 2014-163811 A | 9/2014 | |
| JP | 2014163811 A * | 9/2014 | |
| JP | 2015-114251 A | 6/2015 | |
| JP | 2015-158486 A | 9/2015 | |
| JP | 2015-218079 A | 12/2015 | |
| JP | 6209128 B2 * | 10/2017 | |

OTHER PUBLICATIONS

Hettiarachchi, S., "BWR SCC Mitigation Experiences with Hydrogen Water Chemistry", Proceedings of the 12$^{th}$ International Conference on Environmental Degradation of Materials in Nuclear Power System—Water Reactors-, Salt Lake City, Utah, Aug. 14-18, 2015, pp. 685-701 (Seventeen (17) pages).

BWRVIP-62 Rev. 1 Pre-RAI Submittal Meeting, BWRVIP Presentation to NRC Three White Fling North, MD, Jul. 18, 2014, Electric Power Research Institute (One-hundred and Thirty-Three (133) pages).

* cited by examiner

METHOD FOR RELIEVING CORROSIVE ENVIRONMENT OF BOILING WATER REACTOR, NUCLEAR POWER PLANT, AND METHOD FOR INJECTING NOBLE METAL WHICH IS CARRIED OUT IN NUCLEAR POWER PLANT

CLAIM OF PRIORITY

The present application claims priority from Japanese Patent application serial No. 2016-070291, filed on Mar. 31, 2016, and Japanese Patent application serial No. 2016-070292, filed on Mar. 31, 2016, the contents of which are hereby incorporated by reference into this application.

BACKGROUND OF THE INVENTION

Field of the Invention

The present disclosure relates to a method for relieving a corrosive environment of a boiling water reactor, a nuclear power plant, and a method for injecting a noble metal which is carried out in a nuclear power plant.

Description of Related Art

From a viewpoint of an improvement of an operation rate of a boiling water reactor power plant, it is important to restrain a stress corrosion cracking (SCC) of reactor core internal structures arranged in its reactor pressure vessel, or pipes (for example, primary loop recirculation system pipes) connected to the reactor pressure vessel.

About the stress corrosion cracking, the following matters have been known, and countermeasures against the stress corrosion cracking have been made:

A high-temperature and high-pressure cooling water (a reactor water) contacting pipes connected to reactor core internal structures and a reactor pressure vessel contains oxygen and hydrogen peroxide that are generated by the radiolysis of the reactor water in a reactor core inside the reactor pressure vessel. As an oxygen concentration and a hydrogen peroxide concentration in the reactor water are higher, the stress corrosion cracking is more remarkably generated. Thus, the stress corrosion cracking in each of the reactor core internal structures and the pipes which contact the reactor water can be restrained by decreasing the oxygen concentration and the hydrogen peroxide concentration in the reactor water.

A typical method for restraining the stress corrosion cracking is a noble metal injection. The noble metal injection is a technique of injecting a compound of a noble metal (platinum, rhodium or palladium) into the reactor water to cause the noble metal to adhere onto surfaces of the reactor core internal structures, and internal surfaces of the pipes connected to the reactor pressure vessel, and further injecting hydrogen into the reactor water (see, for example, Japanese Patent Application Laid-Open No. Hei 07-311296 (Patent Literature 1)). The noble metal promotes reaction of hydrogen to each of oxygen and hydrogen peroxide to decrease the concentration of the oxygen or the hydrogen peroxide in the reactor water contacting the surfaces of the reactor core internal structures and the internal surfaces of the pipes connected to the reactor pressure vessel. Patent Literature 1 discloses acetylacetonate compounds of the noble metals, and nitrate compounds of the noble metals as examples of the noble metal compound to be injected into the reactor water.

Furthermore, S. Hettiarachchi, Proceedings of the 12th International Conference on Environmental Degradation of Materials in Nuclear Power Systems, Salt Lake City, Utah, Aug. 14-18, 2005 (Non-Patent Literature 1) publically discloses that the stress corrosion cracking can be effectively restrained by using a technique of injecting a noble metal into the reactor water during the operation of the boiling water reactor power plant, thereby causing the noble metal to adhere onto surfaces of its reactor core internal structures and onto internal surfaces of pipes connected to its reactor pressure vessel (hereinafter, the technique will be referred to as an "in-operation noble metal injecting technique"). In the in-operation noble metal injecting technique, low concentration of sodium hexahydroxoplatinate ($Na_2Pt(OH)_6$) is used as a compound of the noble metal. A pipe through which an aqueous sodium hexahydroxoplatinate solution is to be injected (hereinafter referred to as a "chemical-liquid-injecting pipe") is connected to a feed water system pipe through which a coolant is to be injected to the reactor, and the aqueous sodium hexahydroxoplatinate solution is injected through the chemical-liquid-injecting pipe into feed water to send the water into the reactor water. At the time of the injection of the aqueous sodium hexahydroxoplatinate solution, hydrogen is injected into the feed water from a site of the feed water system pipe that is positioned at an upstream of a joint portion between the feed water system pipe and the chemical-liquid-injecting pipe.

Japanese Patent Application Laid-Open No. 2014-101240 (Patent Literature 2) discloses a technique of substituting sodium ions contained in sodium hexahydroxoplatinate with hydrogen ions, and then radiating gamma rays thereto, thereby producing a platinum oxide colloidal solution.

Furthermore, BWRVIP-62 Rev. 1 Pre-RAI Submittal Meeting, BWRVIP Presentation to NRC Three White Flint North, Md., Jul. 18, 2014 (US NRC Report No. ML14205A603) (Non-Patent Literature 2) discloses a phenomenon that a differential pressure in the chemical-liquid-injecting pipe is raised in accordance with the precipitation of a platinum compound.

Known is also a report that the corrosion of a carbon steel pipe onto which platinum is caused to adhere by the noble metal injection is more largely restrained than in a carbon steel pipe to which no platinum is caused to adhere. The GE Company in USA has so far developed techniques that while a reactor is operated, platinum is injected thereinto, and the techniques have widely been used. Patent Literature 1 is a literature disclosing the contents of the techniques.

In order to restrain the stress corrosion cracking of the reactor structural materials, it is necessary to cause a sufficient amount of platinum onto a reactor pressure vessel made of a stainless steel and a nickel based alloy, primary loop recirculation system pipes made of the stainless steel, reactor water cleanup system pipes made of the stainless steel, and others. The injected noble metal adheres largely onto, particularly, high-temperature sites of the units or apparatuses and pipes. Thus, in conventional noble metal injections, a point of a feed water pipe connected to the reactor pressure vessel has been adopted as a platinum-injecting point to maximize the adhesion of platinum onto the above-mentioned structural materials (the reactor pressure vessel, the primary loop recirculation system pipes, and the reactor water cleanup system pipes).

Japanese Patent Application Laid-Open No. 2015-114251 (Patent Literature 3) describes a nuclear power plant in which a noble metal injecting unit is arranged between an outlet in a cleaning unit, and a confluence point of a reactor water cleanup system pipe and a feed water pipe.

SUMMARY OF THE INVENTION

According to a first aspect of the present disclosure, a method for relieving a corrosive environment of a boiling water reactor, the method including a step of injecting hydrogen and a noble metal compound into water to be replenished into the reactor pressure vessel during a period of a generating operation of a boiling water nuclear power plant including the reactor pressure vessel, in which the hydrogen is injected into water to be supplied into the reactor pressure vessel, and the noble metal compound is injected into water in a line of the boiling water nuclear power plant in which a concentration of oxygen or hydrogen peroxide is stoichiometrically higher than the concentration of hydrogen at which hydrogen undergoes a chemical reaction to turn to water.

According to a second aspect of the present disclosure, a nuclear power plant which is a boiling water type, including: a reactor pressure vessel; a turbine; a steam condenser; a feed water pipe through which water in the steam condenser is replenished to the reactor pressure vessel; a reactor water cleanup system pipe through which water in the reactor pressure vessel is cleaned; a reactor water cleaning unit connected to the reactor water cleanup system pipe; a hydrogen injecting unit which injects hydrogen into water to be supplied to the reactor pressure vessel; and a noble metal injecting unit which injects a noble metal compound into water in a line of the nuclear power plant in which a concentration of oxygen or hydrogen peroxide is stoichiometrically higher than the concentration of hydrogen at which hydrogen undergoes a chemical reaction to turn to water.

The first and second aspects of the present disclosure lead to an advantageous effect that, when a noble metal is injected into a boiling water reactor, the noble metal can be restrained from adhering onto a pipe for an injection and other pipes, and thereby can increase the amount of the noble metal to be injected into a cooling water in a reactor pressure vessel.

According to a third aspect of the present disclosure, a nuclear power plant including: a reactor pressure vessel in which a reactor water is held; a reactor container which includes the reactor pressure vessel therein; a feed water pipe through which a condensed water is supplied into the reactor pressure vessel; a reactor water cleanup unit which cleans the reactor water; a reactor water cleanup system pipe which has the reactor water cleanup unit; a noble metal injecting unit which injects a liquid containing a noble metal into the reactor water; and a heat exchanger which is disposed on the reactor water cleanup system pipe and uses a cleaned reactor water to cool the reactor water that has not yet been cleaned, in which the noble metal injecting unit is connected to a pipe between an outlet of the reactor water cleanup unit, and the heat exchanger.

According to a fourth aspect of the present disclosure, a method for injecting a noble metal which is carried out in a nuclear power plant, the method including the steps of: sending a part of a reactor water filled into a reactor pressure vessel of the nuclear power plant to an outside of a reactor container of the nuclear power plant; cooling and cleaning the reactor water; and injecting a liquid containing the noble metal into the reactor water subsequently, in which the reactor water sent to the outside of the reactor container is cooled, before cleaned, with the cleaned reactor water into which the liquid containing the noble metal has been injected.

The third and fourth aspects of the present disclosure lead to an advantageous effect that, in the nuclear power plant, risks can be decreased that the noble metal precipitates and thus its pipe is blocked at a point through which the noble metal is injected, and further a risk can be decreased that a pipe arranged at a downstream of a cleaning unit of its reactor water cleanup system (RWCU) is corroded.

DETAILED DESCRIPTION OF THE PREFERRED EMBODIMENTS

Figure 1A:
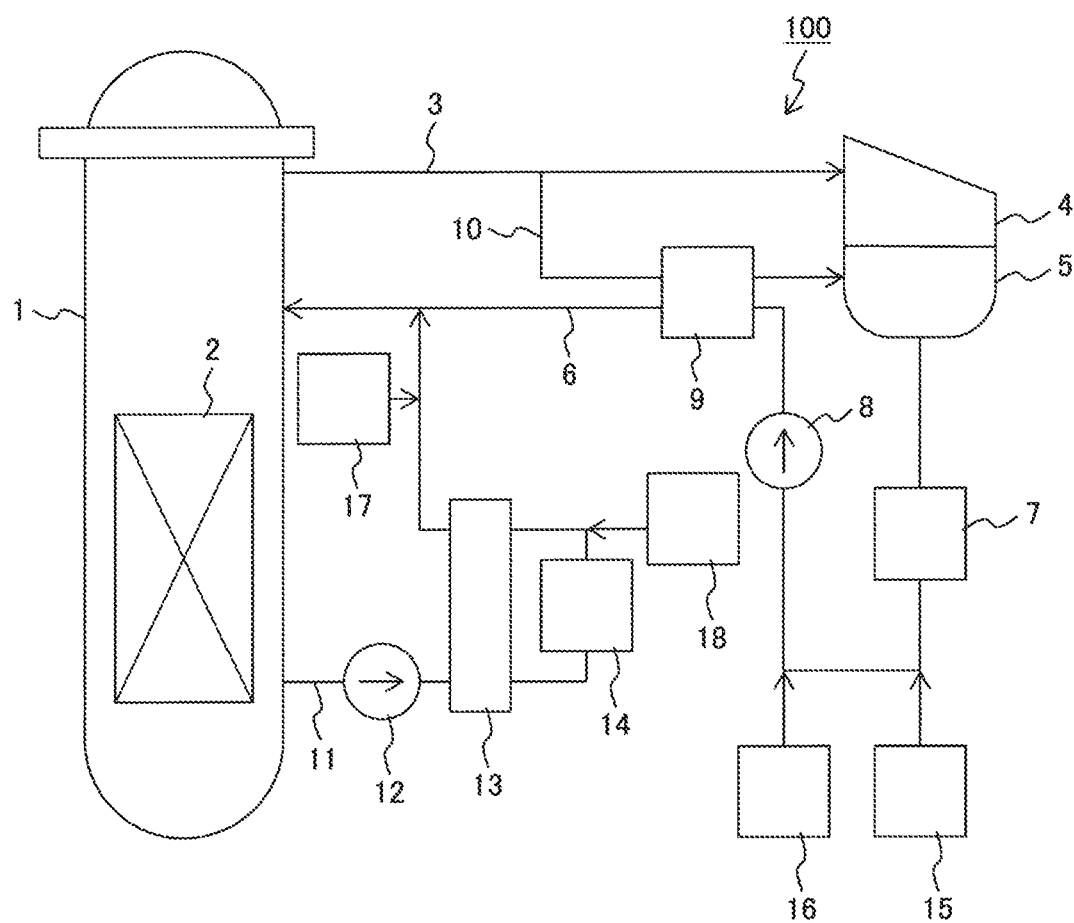
FIG. 1A is a schematic structural view illustrating a nuclear power plant of Example 1.

Initially, problems in the prior art will be described.

As described in Non-Patent Literature 1, in a case where using the in-operation noble metal injecting technique, when an aqueous sodium hexahydroxoplatinate solution is injected through its feed water pipe into the plant, a platinum compound or platinum precipitates partially in the feed water system pipe, and in the vicinity of a connection portion at which a chemical-liquid-injecting pipe is connected to the feed water system pipe, the partial precipitation happening by a thermal decomposition reaction of sodium hexahydroxoplatinate or a reduction reaction that platinum is produced from the platinum compound with hydrogen contained in feed water. Consequently, the amount of the noble metal may be decreased in a reactor water.

In an embodiment in the present disclosure, when a noble metal is injected into a boiling water reactor, the noble metal is restrained from adhering onto a pipe for an injection and other pipes, thereby increasing the amount of the noble metal to be injected into a cooling water in a reactor pressure vessel.

In a nuclear power plant to which the noble metal injection is applied, platinum precipitates at a point of its feed water pipe which is an injecting point of platinum, so that the injecting point may be blocked. This would be because the temperature of feed water is high so that a compound of platinum is thermally decomposed to precipitate platinum.

About platinum injected into the reactor water from the feed water pipe, a part thereof that does not adhere onto the structural materials and pipes of the plant is removed in a reactor water cleanup system (RWCU) thereof. Thus, it is supposed that platinum does not adhere onto pipes and units positioned at a downstream of a cleaning unit of the RWCU.

In many cases, the material of the pipes at the downstream of the cleaning unit of the RWCU is generally a carbon steel or a stainless steel. It can be considered that in the case of stainless steel pipes, the effect of restraining the stress corrosion cracking cannot be gained at the downstream side of the RWCU cleaning unit, to which platinum does not adhere.

An oxidizing species concentration in the reactor water is largely lowered by the noble metal injection; thus, in a case where a pipe at the downstream of the RWCU cleaning unit is a carbon steel pipe, an amount of oxygen supplied to the surface of the pipe is short so that the formation of a stable oxidized coat may be unfavorably restrained. As a result, a risk of a flow-accelerated corrosion would become high.

In another embodiment in the present disclosure, in a nuclear power plant, risks are decreased that a noble metal precipitates and thus its pipe is blocked at a point through which the noble metal is injected, and further a risk is decreased that a pipe arranged at a downstream of a cleaning unit of its RWCU is corroded.

Hereinafter, a description will be initially made about results obtained by examining, in a test, an effect of a concentration of hydrogen onto a reduction reaction of an aqueous sodium hexahydroxoplatinate solution.

Figure 2:
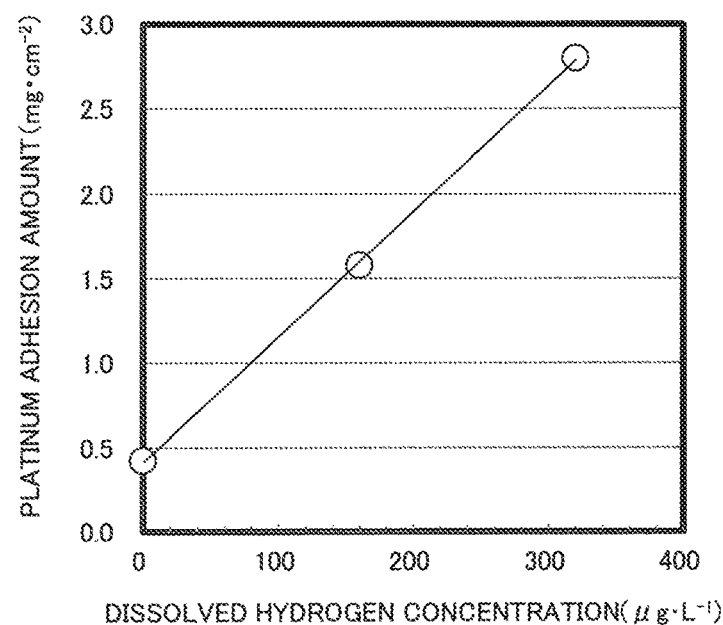
FIG. 2 is a graph showing an effect of a hydrogen concentration onto the adhesion of a platinum compound when an object to be examined is a carbon steel pipe.

FIG. 2 is a graph showing an effect of a concentration of hydrogen onto an adhesion of a platinum compound when an object to be examined by this test is a carbon steel pipe. In FIG. 2, its transverse axis represents the concentration of the dissolved hydrogen; and its vertical axis represents the platinum adhesion amount.

This test was made by passing an aqueous sodium hexahydroxoplatinate solution to the carbon steel pipe. An aqueous sodium hexahydroxoplatinate solution, a platinum concentration of which was 0.05% by mass, was passed into the carbon steel pipe (internal diameter: 0.22 cm, and length: 10 cm), which was heated to 215° C. under a pressure of 8 MPa, at a flow rate of 1 g/min for 8 hours to examine the amount of platinum adhering to an internal surface of the carbon steel pipe. The concentration of the dissolved hydrogen contained in the aqueous sodium hexahydroxoplatinate solution was adjusted to each of 0 μg/L, 160 μg/L and 320 μg/L.

The amount of platinum adhering to the carbon steel pipe was gained by dissolving the internal surface of the carbon steel pipe with aqua regia, and measuring a concentration of platinum contained in the resultant solution by an atomic absorption spectrophotometer.

It is understood from the present graph that a platinum adhesion amount is 2.8 mg·cm$^{-2}$ when the hydrogen concentration is 320 μg/L, and the platinum adhesion amount is 0.4 mg·cm$^2$ when the hydrogen concentration is 0 μg/L comparatively, and thus the platinum adhesion amount can be decreased to about 1/7 by setting the hydrogen concentration to 0.

On the basis of this test result, the inventors have come to have the following new idea:

In a nuclear power plant, a chemical-liquid-injecting pipe is connected to a line in which the concentration of oxygen or hydrogen peroxide is stoichiometrically higher than the concentration of hydrogen at which hydrogen undergoes a chemical reaction to turn to water, and then an aqueous sodium hexahydroxoplatinate solution is injected through this connected pipe into the plant, thereby making it possible to decrease the precipitation amount of any platinum compound in a feed water system pipe, and in the vicinity of a connection portion at which the chemical-liquid-injecting pipe is connected to a pipe of the line.

The following will describe results obtained by examining an advantageous effect obtained when a platinum oxide colloidal solution is used as an injecting agent instead of the aqueous sodium hexahydroxoplatinate solution.

Figure 3:
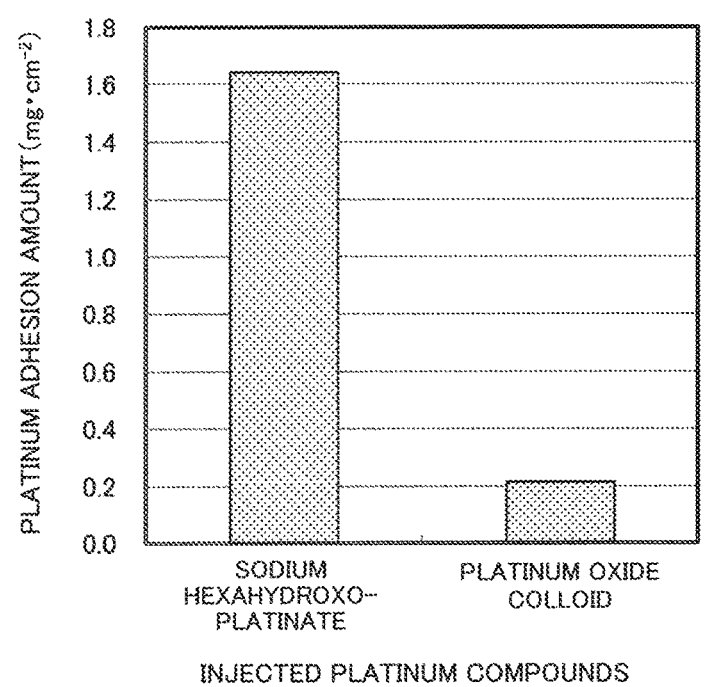
FIG. 3 is a graph showing an effect onto adhesion of platinum compounds onto a carbon steel pipe, this effect being how much difference of injected chemical forms of the platinum compounds influences the adhesion.

FIG. 3 is a graph showing a comparison between the case of injecting an aqueous sodium hexahydroxoplatinate solution into a pipe and the case of injecting a platinum oxide colloidal solution into the same pipe.

The platinum oxide colloidal solution was produced by a method disclosed in Patent Literature 2. The platinum concentration in the aqueous sodium hexahydroxoplatinate solution and that in the platinum oxide colloidal solution were unified into 0.05% by mass. Each of the aqueous sodium hexahydroxoplatinate solution and the platinum oxide colloidal solution was passed into a carbon steel pipe (internal diameter: 0.22 cm; and length: 10 cm) heated to 215° C. at a flow rate of 1 g/min for 8 hours to examine the amount of platinum adhering onto the internal surface of the carbon steel pipe. The concentration of hydrogen dissolved in each of the aqueous sodium hexahydroxoplatinate solution and the platinum oxide colloidal solution was adjusted to 160 μg/L. The amount of platinum adhering to the carbon steel pipe was gained by dissolving the internal surface of the carbon steel pipe with aqua regia, and measuring the concentration of platinum contained in the resultant solution by an atomic absorption spectrophotometer.

The following are understood from the present graph: when the platinum oxide colloidal solution was used, the platinum adhesion amount was 0.21 mg·cm$^{-2}$; when the aqueous sodium hexahydroxoplatinate solution was used, the platinum adhesion amount was 1.63 mg·cm$^{-2}$; and thus the use of the platinum oxide colloidal solution makes it possible to decrease the platinum adhesion amount to about 1/8 as compared with the use of the aqueous sodium hexahydroxoplatinate solution.

On the basis of the test results, the inventors have come to have another new idea that the use of a platinum oxide colloidal solution as an injecting agent makes it possible to decrease the amount of any platinum compound precipitating in the feed water system pipe and in the vicinity of the connection portion between the chemical-liquid-injecting pipe and the line pipe.

Lastly, a description will be made about a result obtained by examining an effect of temperature onto the thermal decomposition of sodium hexahydroxoplatinate.

Figure 4:
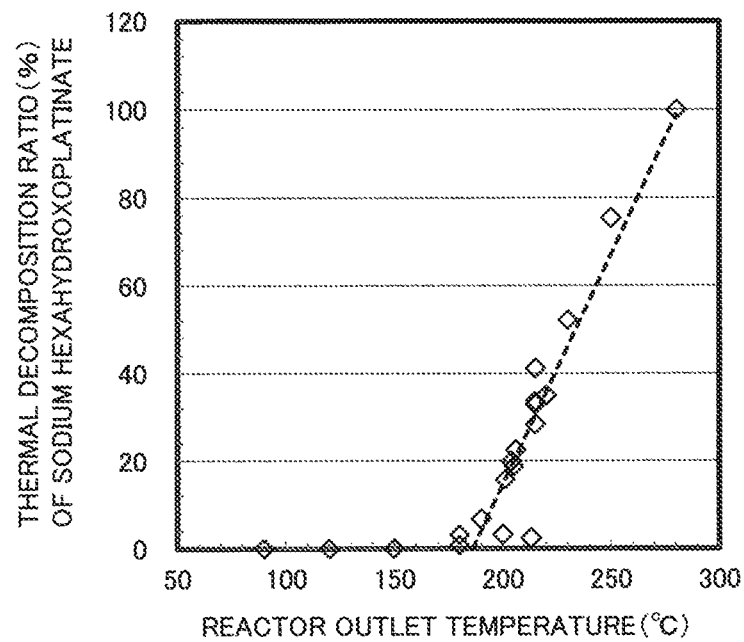
FIG. 4 is a graph showing a temperature dependency of a thermal decomposition ratio of sodium hexahydroxoplatinate.

FIG. 4 is a graph showing a temperature dependency of the proportion of a thermally decomposed fragment in an aqueous sodium hexahydroxoplatinate solution (thermal decomposition ratio therein). Sodium hexahydroxoplatinate is heated, whereby a platinum oxide colloid would be produced.

About conditions for the test, the aqueous sodium hexahydroxoplatinate solution, in which the platinum concentration was 0.05% by mass, was passed into a stainless steel pipe (internal diameter: 0.11 cm; and length: 1 m) including therein tetrafluoroethylene resin and heated 90 to 280° C. under a pressure of 8 MPa. It was assumed that a thermal decomposition reaction therein was represented by a reaction equation (1) described below, and then the thermal decomposition ratio of sodium hexahydroxoplatinate was obtained from a change in the pH of the solution.

$$Na_2Pt(OH)_6 = PtO_2 + 2NaOH + 2H_2O \qquad \text{reaction equation (1)}$$

It is understood from the present graph that at 190° C. or higher, the thermal decomposition of sodium hexahydroxoplatinate is started, and at 280° C. about 100% of the compound has been thermally decomposed.

From this result, the inventors have come to have still another idea that by decomposing sodium hexahydroxoplatinate thermally in a pressure vessel coated with tetrafluoroethylene resin at 190° C. or higher, preferably 280° C. or higher, a platinum oxide colloidal solution can be produced which is suitable for decreasing the precipitation amount of any platinum compound in the feed water system pipe and in the vicinity of the connection portion between the chemical-liquid-injecting pipe and the line pipe.

A first characteristic thereof is as follows: An aqueous sodium hexahydroxoplatinate solution is injected into a line of the plant in which the concentration of oxygen or hydrogen peroxide is stoichiometrically higher than the concentration of hydrogen for each of the following reaction equations (2) and (3), in which oxygen or hydrogen peroxide reacts with hydrogen to turn to water:

$$H_2 + H_2O_2 = 2H_2O \quad \text{reaction equation (2), and}$$

$$2H_2 + O_2 = 2H_2O \quad \text{reaction equation (3)}.$$

By restricting the contact of the injected aqueous sodium hexahydroxoplatinate solution with hydrogen, the amount of the precipitation of any platinum compound, which follows the reduction reaction with hydrogen, can be decreased in the feed water system pipe, and in the vicinity of the connection portion between the chemical-liquid-injecting pipe and the line pipe.

A second characteristic thereof is as follows: A platinum oxide colloidal solution is used as an injecting chemical. About the platinum oxide colloidal solution, by heating sodium hexahydroxoplatinate at 190° C. or higher, more preferably 280° C. or higher in a pressure vessel coated with tetrafluoroethylene resin, sodium hexahydroxoplatinate undergoes a thermal decomposition reaction to produce the platinum oxide colloidal solution. The use of a beforehand produced platinum oxide colloidal solution makes it possible to decrease the amount of the precipitation of any platinum compound, which follows the thermal decomposition reaction, in the feed water system pipe, and in the vicinity of the connection portion between the chemical-liquid-injecting pipe and the line pipe.

More preferably, the chemical-liquid-injecting pipe is connected to the line in which the concentration of oxygen or hydrogen peroxide is stoichiometrically higher than the concentration of hydrogen for each of the reaction equations (2) and (3), in which oxygen or hydrogen peroxide reacts with hydrogen to turn to water. From this connected pipe, a platinum oxide colloidal solution is injected into the plant. This operation makes it possible to decrease the amount of the precipitation of any platinum compound, which follows the reduction reaction with hydrogen and the thermal decomposition reaction, in the feed water system pipe, and in the vicinity of the connection portion between the chemical-liquid-injecting pipe and the line pipe.

Hereinafter, working examples will be described with reference to some of the drawings.

Example 1

FIG. 1A is a view illustrating a structure of a nuclear power plant of the present example.

The nuclear power plant illustrated in this figure, which is a boiling water reactor power plant 100, has a reactor pressure vessel 1, a turbine 4, a water condenser 5, a reactor water cleanup system and a feed water system. Inside the reactor pressure vessel 1, a reactor core 2 is arranged in which plural fuel assemblies are loaded. The fuel assemblies each include plural fuel rods each filled with plural fuel pellets made of a nuclear fuel material. Plural internal pumps (not illustrated) are arranged onto the bottom of the reactor pressure vessel 1. A main steam pipe 3 connected to the reactor pressure vessel 1 is connected to the turbine 4.

The feed water system has a structure in which a condensed water filtrating and demineralizing unit 7, a water supplying pup 8, and a feed water heater 9 are arranged, in this order from the water condenser 4 toward the reactor pressure vessel 1, at a feed water pipe 6 through which the water condenser 5 is connected to the reactor pressure vessel 1. The turbine 4 is set onto the water condenser 5, and the water condenser 5 is connected to the turbine 4. A bypass pipe 10 connected to the main steam pipe 3 is connected through the feed water heater 9 to the water condenser 5.

The reactor water cleanup system has a structure in which a reactor water cleanup system pump 12, a regenerated heat exchanger 13, a not-regenerated heat exchanger (not illustrated), and a reactor water cleaning unit 14 are arranged, in this order, at a reactor water cleanup system pipe 11 for taking out a reactor water partially from the reactor pressure vessel 1, this pipe 11 being arranged to be joined into a middle of the feed water pipe 6. The reactor water cleanup system pipe 11 is connected to the feed water pipe 6 at the downstream of the feed water heater 9. The reactor pressure vessel 1 is arranged inside a reactor container inside a reactor building (not illustrated).

Cooling water inside the reactor pressure vessel 1 (hereinafter referred to as a "reactor water") is heightened in pressure through the internal pump to be supplied to the reactor core 2. The reactor water supplied into the reactor core 2 is heated by heat generated by nuclear fission of the nuclear fuel material inside the fuel rods. The heated reactor water is partially turned to steam. From the steam, water is removed inside a steam separating unit (not illustrated) and a steam drying unit (not illustrated) disposed inside the reactor pressure vessel 1. Thereafter, the steam is introduced from the reactor pressure vessel 1 through the main steam pipe 3 to the turbine 4 to rotate the turbine 4. A power generator (not illustrated) connected to the turbine 4 is rotated to generate electric power.

The steam discharged from the turbine 4 is condensed in the water condenser 5 to turn to water. The water is passed through the feed water pipe 6 to be supplied, as feed water, into the reactor pressure vessel 1. From the feed water flowing in the feed water pipe 6, impurities are removed in the condensed water filtrating and demineralizing unit 7, and then the feed water is heightened in pressure through the water supplying pump 8. Inside the feed water heater 9, the feed water is heated by extraction-steam extracted from the main steam pipe 3 in the steam extracting pipe 10, and then introduced through the feed water pipe 6 into the reactor pressure vessel 1.

The reactor water inside the reactor pressure vessel 1 is partially caused to flow into the reactor water cleanup system pipe 11 of the reactor water cleanup system by driving the reactor water cleanup system pump 12, and then cooled through the regenerated heat exchanger 13 and the non-regenerated heat exchanger. Thereafter, the partial reactor water is cleaned in a reactor water cleaning unit 14. The cleaned reactor water is heated through the regenerated heat exchanger 13, and is returned through the reactor water cleanup system pipe 11 and the feed water pipe 6 into the reactor pressure vessel 1.

An oxygen injecting unit 15 and a hydrogen injecting unit 16 are arranged at the feed water pipe 6 between the reactor water cleaning unit 7 and the water supplying pump 8. Form these units, oxygen gas and hydrogen gas are respectively injected into the feed water. The oxygen gas is injected to set the concentration of oxygen dissolved in the feed water into the range of 20 to 50 µg/L. Moreover, when the in-operation noble metal injecting technique is used while the plant is operated, the hydrogen gas is injected to set the concentration of hydrogen dissolved in the feed water into the range of 200 to 400 µg/L. In the present example, a noble metal injecting unit 17 for injecting a noble metal compound into the reactor water is arranged at a site of the reactor water cleanup system pipe 11 that is positioned from the reactor water cleaning unit 14 to a confluence point of the pipe 11 and the feed water pipe 6. An oxidizer injecting unit 18 is arranged at a site of the reactor water cleanup system pipe 11 that is positioned at the upstream side of the noble metal injecting unit 17.

In the figure, FIG. 1A, the noble metal injecting unit 17 is arranged at a site of the reactor water cleanup system pipe 11 that is positioned from the regenerated heat exchanger 13 to a confluence point of the pipe 11 and the feed water pipe 6. The oxidizer injecting unit 18 is arranged at a site of the reactor water cleanup system pipe 11 that is positioned at the downstream side of the reactor water cleaning unit 14 and at the upstream side of the regenerated heat exchanger 13.

Figure 1B:
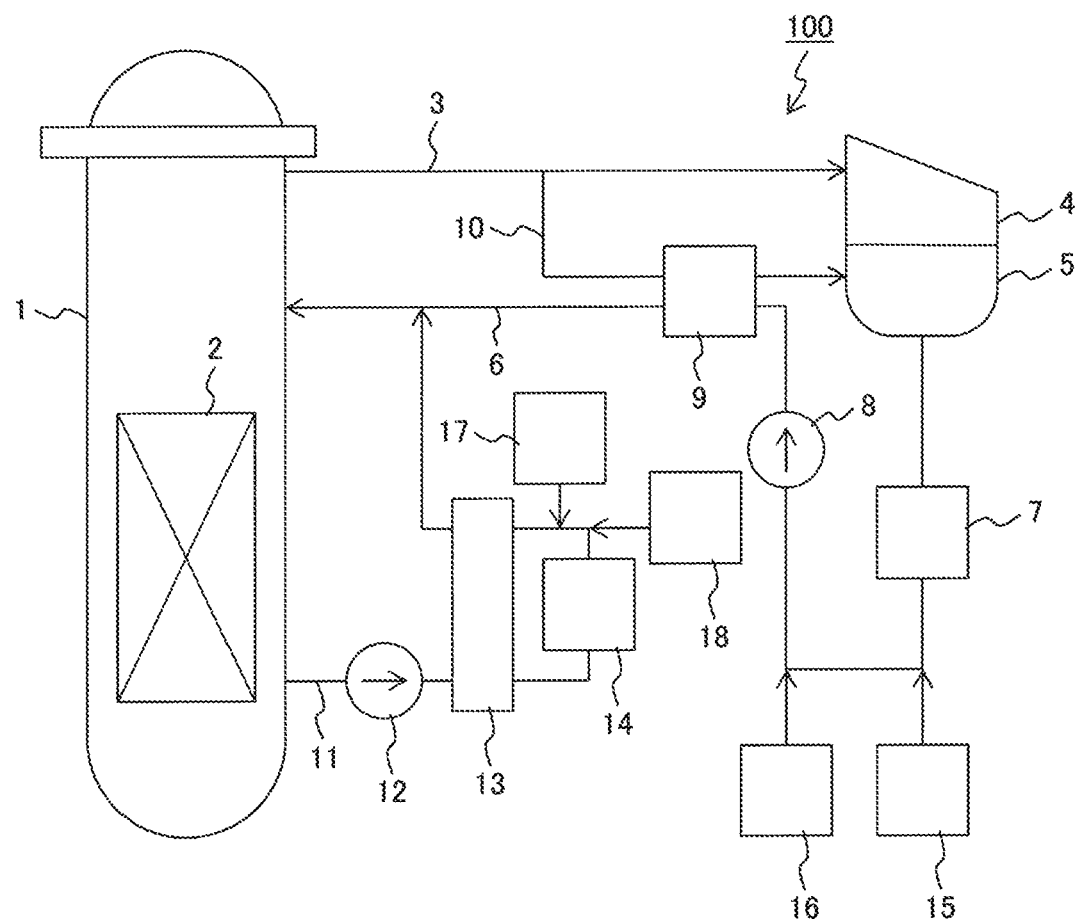
FIG. 1B is a schematic structural view illustrating a modified example of the nuclear power plant in FIG. 1A.

FIG. 1B is a view illustrating a modified example of the boiling water reactor power plant 100 in FIG. 1A.

In FIG. 1B, a noble metal injecting unit 17 is arranged at a part of a reactor water cleanup system pipe 11 positioned at the downstream side of an oxidizer injecting unit 18 and at the upstream side of a regenerated heat exchanger 13. In FIG. 1B, other constituents are the same as in FIG. 1A.

When the noble metal injecting unit 17 is connected to the reactor water cleanup system pipe 11 in the vicinity of a feed water pipe 6, an advantage is produced that the length of a site of the pipe in which an injected noble metal flows until the noble metal is taken into the reactor pressure vessel 1 is small. In the meantime, when the noble metal injecting unit 17 is arranged at a part of the reactor water cleanup system pipe 11 through which the regenerated heat exchanger 13 and the reactor water cleaning unit 14 are connected to each other, an advantage is produced that a compound of the noble metal can be injected into in-line water low in temperature.

Figure 5:
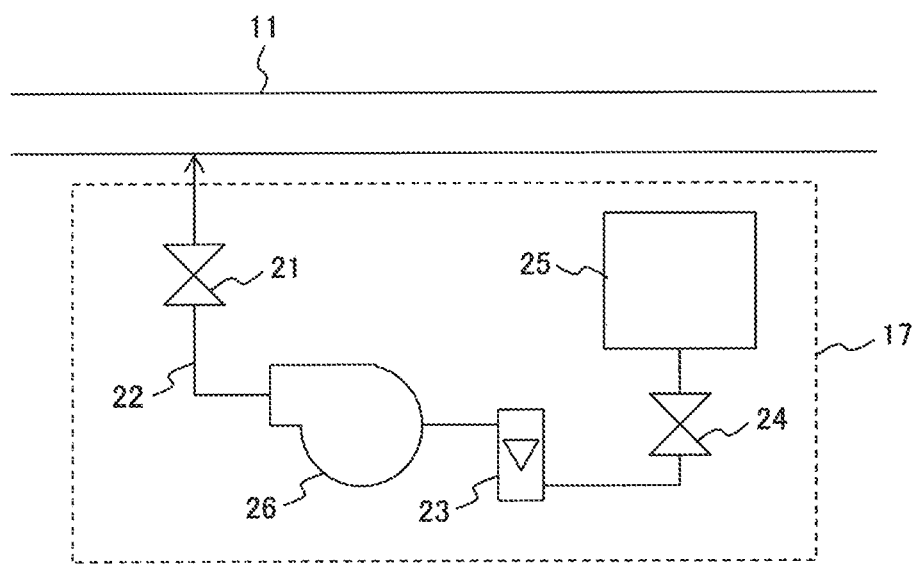
FIG. 5 is a structural view illustrating a noble metal injecting unit preferred for Example 1.

FIG. 5 illustrates details of the noble metal injecting unit 17.

In this figure, the noble metal injecting unit 17 has a chemical liquid tank 25 filled with a noble metal compound solution (for example, an aqueous sodium hexahydroxoplatinate solution), a pump 26, valves 21 and 24, and a pipe 22 through which these members are connected to each other, this pipe 22 being connected to the reactor water cleanup system pipe 11. The valve 21 is positioned at the downstream side of the pump 26. The valve 24 is positioned between the chemical liquid tank 25 and the pump 26. Between the valve 24 and the pump 26, a flow rate meter 23 is arranged.

By opening the valves 24 and 21 and starting the operation of the pump 26, the noble metal compound solution is injected into the reactor water cleanup system pipe 11 from the chemical liquid tank 25. The flow rate thereof is adjusted by the pump 26, and is checked through the flow rate meter 23.

When hydrogen peroxide is injected as an oxidizer into the plant, the oxidizer injecting unit 18 in FIG. 1A may have the same structure as the noble metal injecting unit 17 in FIG. 5. The oxidizer injecting unit 18 may have a structure in which the chemical liquid tank 25 is filled with hydrogen peroxide water instead of the noble metal compound solution.

Figure 6:
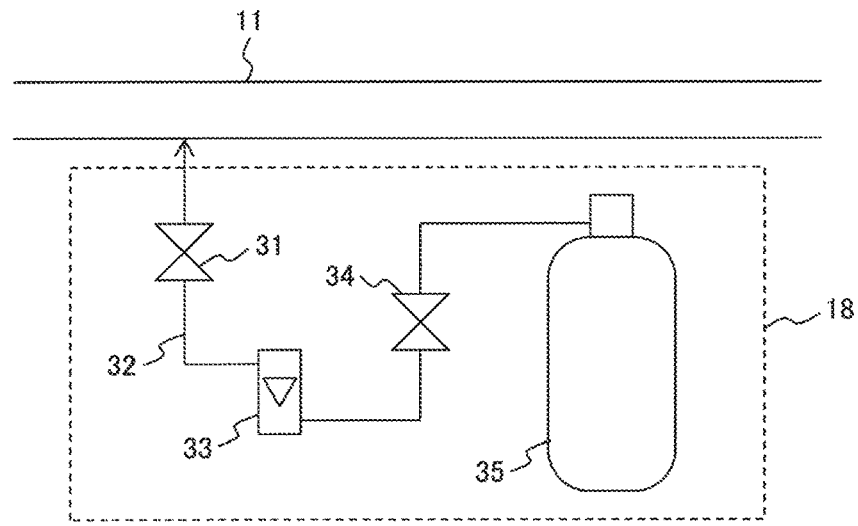
FIG. 6 is a structural view illustrating an oxidizer injecting unit preferred for Example 1.

FIG. 6 is a view illustrating the oxidizer injecting unit 18 in the case of injecting oxygen as the oxidizer into the plant.

In this figure, a cylinder 35 filled with oxygen is connected to the reactor water cleanup system pipe 11 through a pipe 32. A reduced pressure flow rate adjusting valve 34, a flow rate meter 33 and a valve 31 are arranged at the pipe 32 in this order from the cylinder 35 at the upstream side of this unit 18.

Hereinafter, a description will be made with reference to FIGS. 1A, 5 and 6 about steps in which the in-operation noble metal injecting technique is used while the plant is operated.

Initially, from the oxidizer injecting unit 18, hydrogen peroxide or oxygen is injected into the plant to make the concentration of oxygen or hydrogen peroxide flowing in the reactor water cleanup system pipe 11 not less than the concentration necessary for causing oxygen or hydrogen peroxide to react with hydrogen to turn to water. Hereinafter, oxygen and hydrogen peroxide is generically called the "oxidizer".

The respective concentrations of the oxidizer and dissolved hydrogen that flow in the reactor water cleanup system pipe 11 can be grasped by measuring the oxygen concentration and the hydrogen peroxide concentration in a reactor water collected from a sampling pipe arranged at the reactor water cleanup system pipe 11, through which the regenerated heat exchanger 13 and the reactor water cleaning unit 14 are connected to each other. When the dissolved oxygen concentration, the hydrogen peroxide concentration, and the dissolved hydrogen concentration are represented by $C_{O2}$ [unit: mol/L], $C_{H2O2}$ [unit: mol/L], and $C_{H2}$ [unit: mol/L], respectively, and further the concentration of excessive dissolved oxygen and that of excessive hydrogen peroxide are represented by $\Delta CI_{O2}$ [unit: mol/L] and $\Delta CI_{H2O2}$ [unit: mol/L], respectively, oxygen and hydrogen peroxide are injected into the plant to adjust the dissolved oxygen concentration $CI_{O2}$ in the reactor water flowing in the reactor water cleanup system pipe 11 into a value calculated in accordance with the following equation (4), and adjust the hydrogen peroxide concentration $CI_{H2O2}$ in the same water into a value calculated in accordance with the following equation (5):

$$CI_{O2}=2\times C_{H2O2}+C_{O2}-2\times C_{H2}+\Delta CI_{O2} \qquad \text{equation (4)},$$

and $$CI_{H2O2}=C_{H2O2}+0.5\times C_{O2}-C_{H2}+\Delta CI_{H2O2} \qquad \text{equation (5)}.$$

When hydrogen peroxide is injected into the plant, the injection flow rate $FT_{H2O2}$ [unit: L/h] thereof is represented by the following equation (6), using the concentration $CT_{H2O2}$ [unit: mol/L] of hydrogen peroxide filled into the chemical liquid tank 25 and the flow rate $F_{RWCU}$ [unit: L/h] of the reactor water flowing in the reactor water cleanup system pipe 11:

$$FT_{H2O2}=(CI_{H2O2}/CT_{H2O2})\times F_{RWCU} \qquad \text{equation (6)}.$$

Moreover, when oxygen is injected into the plant, the injection flow rate $FT_{O2}$ [unit: NL/h] thereof is represented by the following equation (7), using the concentration X [unit: % by volume] of oxygen filled into the cylinder 35 and the flow rate $F_{RWCU}$ [unit: L/h] of the reactor water flowing in the reactor water cleanup system pipe 11:

$$FT_{O2}=CI_{O2} \times F_{RWCU} \times (100/X) \times 22.4 \qquad \text{equation (7)}.$$

It is sufficient for the excessive dissolved oxygen concentration $\Delta CI_{O2}$ and the excessive hydrogen peroxide concentration $\Delta CI_{H2O2}$ to be set into the range of 0.5 to 2.0 μmol/L, and that of 1.0 to 4.0 μmol/L, respectively.

When hydrogen peroxide is injected as the oxidizer in accordance with the thus set injection flow rate, the valves 21 and 24 are opened in the oxidizer injecting unit 18 having a structure in which the chemical liquid tank 25 in FIG. 5 is filled with hydrogen peroxide water instead of the noble metal compound solution (the same structure as the noble metal injecting unit 17 in FIG. 5), and further the flow rate of flow through the pump 26 is set to produce the injection flow rate $FT_{H2O2}$. In this state, hydrogen peroxide is injected into the reactor water. When the injection becomes unnecessary, the pump 26 is stopped and the valves 21 and 24 are closed.

When oxygen is injected as the oxidizer, the valve 31 of the oxidizer injecting unit 18 in FIG. 6 is opened and further the flow rate of flow through the reduced pressure flow rate adjusting valve 34 is set to render the oxygen gas injection flow rate the injection flow rate $FT_{O2}$. In this state, oxygen is injected into the reactor water. When the injection becomes unnecessary, the reduced pressure flow rate adjusting valve 34 is closed and the valve 31 is closed.

Next, a noble metal compound is injected through the noble metal injecting unit 17 in FIG. 5 into the plant. Herein, as an example, a case is described in which a sodium hexahydroxoplatinate solution is injected as the noble metal compound. The injection flow rate $FT_{PT}$ [unit: L/h] of the solution from the noble metal injecting unit 17 is represented by the following equation (8), using the platinum concentration $CT_{H2O2}$ [unit: mol/L] in the sodium hexahydroxoplatinate solution filled into the chemical liquid tank 25, the platinum concentration $CI_{RWCU}$ [unit: mol/L] in reactor water flowing in the reactor water cleanup system pipe 11, and the flow rate $F_{RWCU}$ [unit: L/h] of the reactor water flowing in the reactor water cleanup system pipe 11:

$$FT_{PT}=(CI_{PT}/CI_{PT}) \times F_{RWCU} \qquad \text{equation (8)}$$

A corrosive environment relieving effect can be obtained, for example, by setting the injection amount $(CI_{PT} \times F_{RWCU})$ of platinum to 0.01 mol/L and continuing the injection over about 10 days.

Moreover, an advantage that a fluctuation in the electric conductivity that follows the injection of platinum can be made small is obtainable by making the injection amount of platinum small and further making the injection period long, for example, by setting the injection amount $(CI_{PT} \times F_{RWCU})$ of platinum to 0.001 mol/L and continuing the injection over about 100 days.

When the noble metal compound is injected from the noble metal injecting unit 17 in accordance with the thus set injection flow rate, the valves 21 and 24 of the noble metal injecting unit 17 (in FIG. 5) are opened, and further the flow rate of flow through the pump 26 is set to produce the injection flow rate $FT_{PT}$. In this state, the sodium hexahydroxoplatinate solution is injected into the reactor water. When the injection becomes unnecessary, the pump 26 is stopped and the valves 21 and 24 are closed.

Example 2

Figure 7:
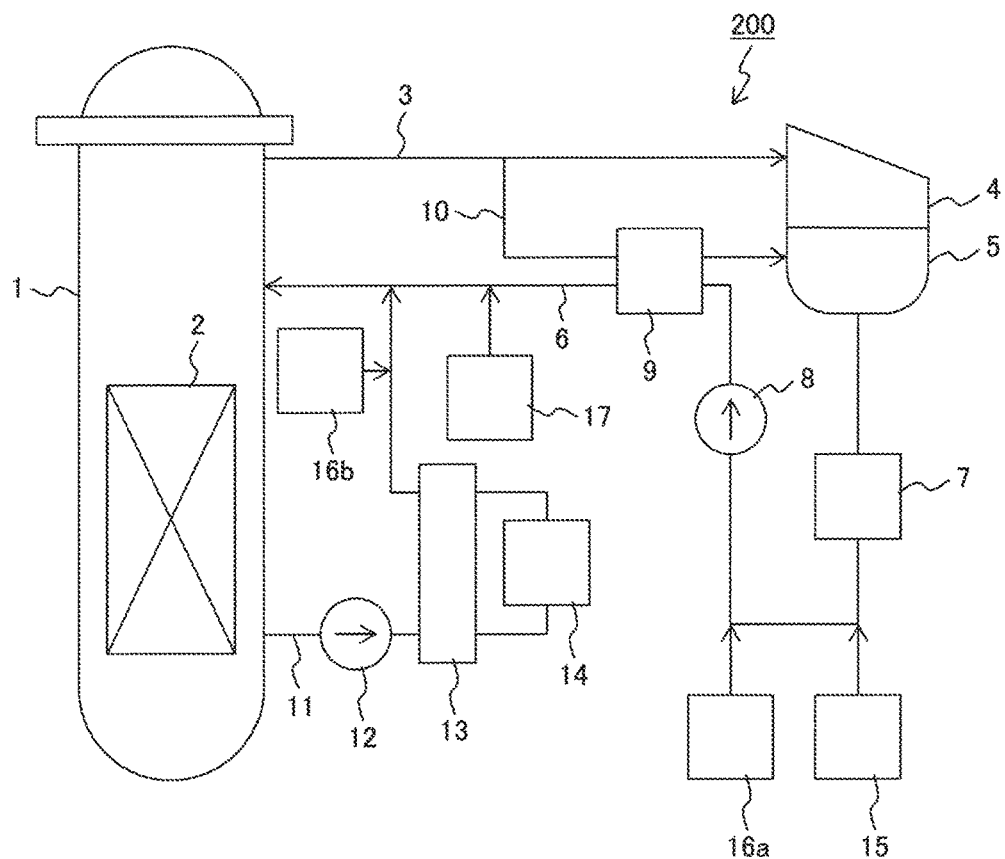
FIG. 7 is a schematic structural view illustrating a nuclear power plant of Example 2.

FIG. 7 is a view illustrating the structure of a nuclear power plant of the present example.

Hereinafter, a description will be made about differences of the present example from Example 1. Any description about the same constituents as in Example 1 is omitted.

The differences of the nuclear power plant in this figure, which is a plant 200, from Example 1 are in that in addition to a hydrogen injecting unit 16a (a first hydrogen injecting unit) arranged at a feed water pipe 6, a hydrogen injecting unit 16b (a second hydrogen injecting unit) is also arranged at a reactor water cleanup system pipe 11, and further a noble metal injecting unit 17 is arranged at a feed water pipe 6. This configuration makes it possible to adjust the amount of hydrogen to be injected from the hydrogen injecting unit 16a, so that oxygen to be injected from the oxygen injecting unit 15 can be caused not to disappear completely inside the feed water pipe 6. Accordingly, the noble metal compound to be injected from the noble metal injecting unit 17 can be injected into feed water in which the concentration of oxygen or hydrogen peroxide is stoichiometrically higher than that of hydrogen. Thus, Example 2 has an advantage that it becomes unnecessary to set up the oxidizer injecting unit 18 additionally as seen in Example 1.

About the hydrogen concentration $C_{H2,RWCU}$ in the reactor water flowing in the reactor water cleanup system pipe 11, it is necessary to inject hydrogen from the hydrogen injecting unit 16b to produce a hydrogen concentration calculated in accordance with the following equation (9), using the dissolved hydrogen concentration $C_{H2}$ [unit: mol/L], the flow rate $F_{FW}$ [unit: L/h] of feed water, and the flow rate $F_{RWCU}$ [unit: L/h] of the reactor water flowing in the reactor water cleanup system pipe 11:

$$C_{H2,RWCU}=C_{H2} \times (F_{FW}/F_{RWCU}) \qquad \text{equation (9)}.$$

In this case, the concentration $C_{H2}$ ranges desirably from 200 to 400 μg/L.

Example 3

In the present example, a description will be made about a method for injecting a noble metal from a noble metal injecting point, and a nuclear power generation plant (which may be referred to as a nuclear power plant). The wording "injecting point" described in the present specification denotes an "injecting site" having a predetermined sectional area.

The noble metal injection in the present example into a reactor water is applied to a reactor pressure vessel, a feed water system pipe, a primary loop recirculation system pipe and a reactor water cleanup system pipe in a boiling water nuclear power station. In the present example, the noble metal injection is performed while an operation is being made or stopped in any boiling water nuclear power station.

Figure 8:
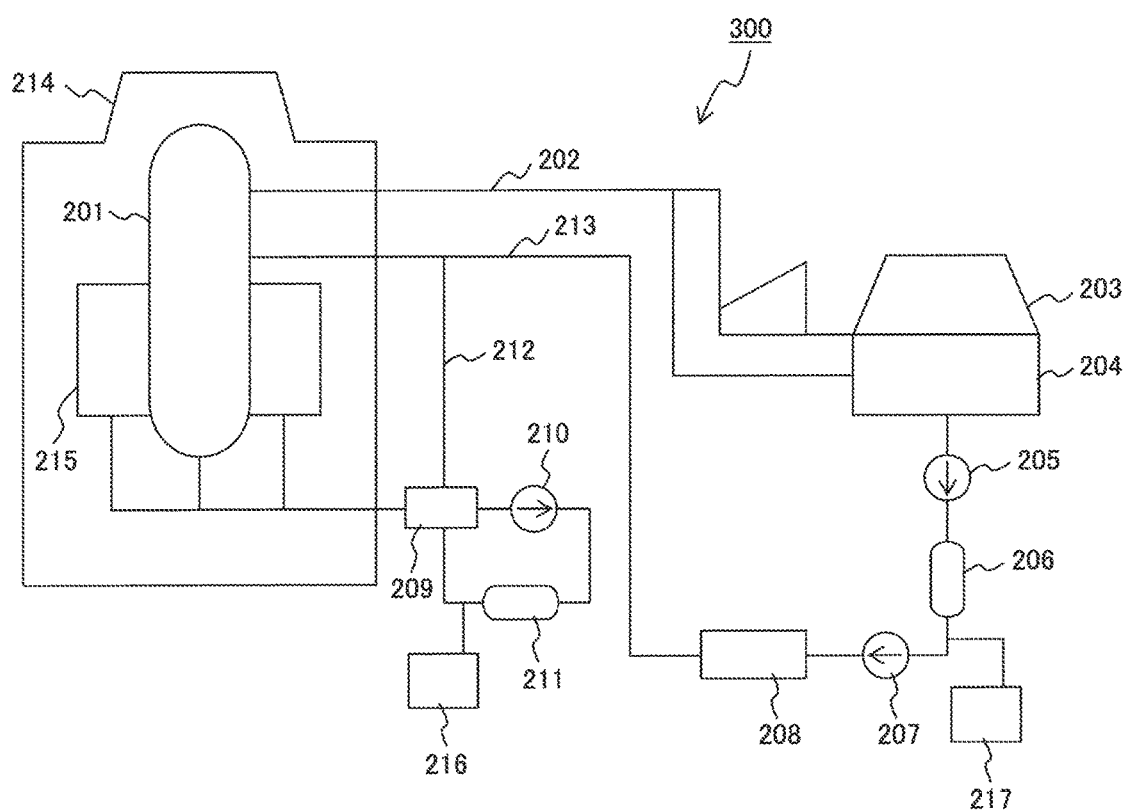
FIG. 8 is a schematic structural view illustrating a boiling water reactor power plant of Example 3.

FIG. 8 is a view illustrating the structure of a boiling water nuclear power station used when the method for the noble metal injection into the reactor water is performed.

As illustrated in this figure, a nuclear power plant 300 (a boiling water nuclear power plant) has a reactor pressure vessel 201, a turbine 203, a water condenser 204, a feed water system, a primary loop recirculation system, a reactor water cleanup system, and others.

In the feed water system, a condensed water pump 205, a condensed water cleaning unit 206, a feed water pump 207, and a feed water heater 208 are fitted, in this order, to a feed water pipe 213 through which the water condenser 204 and the reactor pressure vessel 201 are connected to each other.

In the reactor water cleanup system, a heat exchanger 209, a reactor water cleanup system pump 210, and a reactor water cleaning unit 211 are fitted, in this order, to a reactor water cleanup system pipe 212 through which a primary loop recirculation system pipe 215 and the feed water pipe 213 are connected to each other. A coolant (a reactor water) flowing in the reactor water cleanup system flows into the reactor water cleanup system pipe 212, and then cooled in the heat exchanger 209. Thereafter, the coolant is cleaned in the reactor water cleaning unit 211. The cleaned coolant is heated in the heat exchanger 209, and then passed through the reactor water cleanup system pipe 212 and the feed water pipe 213 to flow into the reactor pressure vessel 201. The reactor pressure vessel 201 is arranged inside a reactor container 214.

A noble metal injecting unit 216 is arranged at the reactor water cleanup system pipe 212 between an outlet in the reactor water cleaning unit 211 and the heat exchanger 209. In the reactor, a noble metal injected from an injecting point of the noble metal injecting unit 216 is passed through the feed water pipe 213, and then shifted into the reactor pressure vessel 201, the primary loop recirculation system pipe 215 and the reactor water cleanup system to adhere onto the surface of the structural material of the plant.

The noble metal may be any one of platinum, palladium, rhodium, ruthenium, osmium and iridium. The noble metal is used in the state that a noble metal compound (such as sodium hexahydroxoplatinate hydrate ($Na_2[Pt(OH)_6] \cdot nH_2O$)) is dissolved or dissolved in water.

A hydrogen injecting unit 217 used at the same time of the injection of the noble metal is arranged at the downstream side of the condensed water cleaning unit 206. Hydrogen injected from the downstream side of the condensed water cleaning unit 206 is passed through the water supplying line, and then shifted to the reactor pressure vessel 201 to contribute to recombination reaction with oxidizing species inside the reactor pressure vessel 201. Almost all of an unreacted fragment of hydrogen is passed through a main steam system pipe 202 to reach the turbine 204 while the fragment is partially passed through the primary loop recirculation system pipe 215 and then shifted to the reactor water cleanup system.

In the present example, the temperature of the noble metal injecting point is about 50° C. to be lower than that (about 225° C.) of any conventional injecting point. Thus, a risk is lowered that the noble metal is precipitated by thermal decomposition. In the present example, the hydrogen concentration in the noble metal injecting point is about 0.05 ppm to be lower than that (about 0.3 ppm) in any conventional injecting point. Thus, another risk can also be reduced that the noble metal is precipitated by reduction with hydrogen.

In conclusion, the temperature of the reactor water in the injecting point of the noble metal is desirably from 30 to 70° C., more desirably from 40 to 60° C.

The hydrogen concentration in the reactor water in the injecting point of the noble metal is desirably 0.1 ppm or less, more desirably 0.05 ppm or less.

The noble metal, such as platinum, injected from the noble metal injecting point can be expected to adhere also onto a pipe at the downstream side of the cleaning unit set up in a RWCU. Thus, it can be considered that when the pipe at the downstream side of the cleaning unit is a carbon steel pipe, a risk of the flow-accelerated corrosion is lowered, and when this downstream side pipe is a stainless steel pipe, a risk of the stress corrosion cracking is lowered.

DESCRIPTION OF REFERENCE NUMERALS

1: Reactor pressure vessel, 2: reactor core, 3: main steam pipe, 4: turbine, 5: water condenser, 6: feed water pipe, 7: condensed water filtrating and demineralizing unit, 8: water supplying pump, 10: steam extracting pipe, 11: reactor water cleanup system pipe, 12: reactor water cleanup system pump, 13: regenerated heat exchanger, 14: reactor water cleaning unit, 15: oxygen injecting unit, 16, 16a and 16b: hydrogen injecting units, 17: noble metal injecting unit, 18: oxidizer injecting unit, 21, 24, 31 and 34: valves, 22, and 32: pipes, 23 and 33: flow rate meters, 25: chemical liquid tank, 35: cylinder, 100: boiling water reactor power plant, 200 and 300: nuclear power plants, 201: reactor pressure vessel, 202: main steam system pipe, 203: turbine, 204: water condenser, 205: condensed water pump, 206: condensed water cleaning unit, 207: feed water pump, 208: feed water heater, 209: heat exchanger, 210: reactor water cleanup system pump, 211: reactor water cleaning unit, 212: reactor water cleanup system pipe, 213: feed water pipe, 214: reactor container, 215: primary loop recirculation system pipe, 216: noble metal injecting unit, and 217: hydrogen injecting unit.

What is claimed is:

1. A method for relieving a corrosive environment of a boiling water reactor, the method comprising the steps of:
   heating a sodium hexahydroxoplatinate solution to 190° C. or higher to produce a platinum oxide colloid, then
   injecting hydrogen and the platinum oxide colloid into a water line to be supplied into the reactor pressure vessel during power generation of the boiling water nuclear, and
   injecting oxygen or hydrogen peroxide in the water line, wherein
   a concentration of the injected oxygen or hydrogen peroxide in the water line is stoichiometrically higher than the concentration of the injected hydrogen.

2. The method for relieving the corrosive environment of the boiling water reactor according to claim 1,
   wherein the platinum oxide colloid is injected into the water line downstream of where the oxygen or hydrogen peroxide is injected.

3. The method for relieving the corrosive environment of the boiling water reactor according to claim 1,
   wherein the sodium hexahydroxoplatinate solution is heated to 280° C. or higher to produce the platinum oxide colloid.

* * * * *